(12) United States Patent
Regunathan et al.

(10) Patent No.: US 7,162,093 B2
(45) Date of Patent: Jan. 9, 2007

(54) SLICE-LAYER IN VIDEO CODEC

(75) Inventors: Shankar Regunathan, Bellevue, WA (US); Pohsiang Hsu, Redmond, WA (US); Ce Wang, Redmond, WA (US); Chih-Lung Lin, Redmond, WA (US); Jie Liang, Coquitlam (CA); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 160 days.

(21) Appl. No.: 10/933,960

(22) Filed: Sep. 3, 2004

(65) Prior Publication Data

US 2005/0053158 A1   Mar. 10, 2005

Related U.S. Application Data

(60) Provisional application No. 60/501,081, filed on Sep. 7, 2003.

(51) Int. Cl.
*G06K 9/36* (2006.01)
*G06K 9/46* (2006.01)

(52) U.S. Cl. .................. 382/233; 382/250; 382/260; 375/240.25

(58) Field of Classification Search ........ 382/232–233, 382/236, 238, 239, 245–246, 250–253; 375/240.25, 375/40.24, 240.18, 240.14, 240.24
See application file for complete search history.

(56) References Cited

U.S. PATENT DOCUMENTS

| | | | |
|---|---|---|---|
| 4,982,270 A | | 1/1991 | Tanaka et al. |
| 5,168,356 A | | 12/1992 | Acampora et al. |
| 5,638,126 A | * | 6/1997 | Lim ............ 375/240.03 |
| 5,970,173 A | | 10/1999 | Lee et al. |
| 6,324,216 B1 | * | 11/2001 | Igarashi et al. ........ 375/240.14 |
| 2004/0013202 A1 | * | 1/2004 | Lainema ............... 375/240.18 |
| 2004/0151252 A1 | * | 8/2004 | Sekiguchi et al. ..... 375/240.25 |

FOREIGN PATENT DOCUMENTS

JP        4014318        1/1992

OTHER PUBLICATIONS

U.S. Appl. No. 60/341,674, filed Dec. 17, 2001, Lee et al.
U.S. Appl. No. 60/488,710, Jul. 18, 2003, Srinivasan et al.
Reader, "History of MPEG Video Compression—Ver. 4.0," 99 pp., document marked Dec. 16, 2003.
Printouts of FTP directories from http://ftp3.itu.ch, 8 pp. (downloaded from the World Wide Web on Sep. 20, 2005).
Frossard et al., "AMISP: A Complete Content-Based MPEG-2 Error-Resilient Scheme," *IEEE Transactions on Circuits and Systems for Video Technology*, vol. II, No. 9, pp. 989-998 (Sep. 2001).

(Continued)

*Primary Examiner*—Matthew C. Bella
*Assistant Examiner*—Ali Bayat
(74) *Attorney, Agent, or Firm*—Klarquist Sparkman, LLP

(57) ABSTRACT

A video encoder/decoder utilizes a bistream syntax that provides an independently decodable, partial picture unit, which may be in the form of a unit containing one or more contiguous rows of macroblocks (called a slice). This slice layer provides a flexible combination of error-resilience and compression efficiency. The slice layer encodes an efficient addressing mechanism (e.g., a syntax element specifying a beginning macroblock row of the slice layer), as well as an efficient mechanism to optionally retransmit picture header information. The slice layer provides decoding and reconstruction independence by disabling all forms of prediction, overlap and loop-filtering across slice-boundaries. This permits a slice coded in intra-mode to be reconstructed error-free, irrespective of errors in other regions of the picture.

6 Claims, 11 Drawing Sheets

OTHER PUBLICATIONS

Mohsenian et al., "Adaptive Entropy Constrained Transform Coding of Magnetic Resonance Image Sequences," *IBM Microelectronics, Advanced Digital Video Laboratories, Endicott, NY*, pp. 1-8.

Swann et al., "Transcoding of MPEG-II for Enhanced Resilience to Transmission Errors," *Cambridge University Engineering Department, Cambridge, UK*, pp. 1-4.

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mook, "Next-Gen Windows Media Player Leaks to the Web," *BetaNews*, 17 pp. (Jul. 19, 2002) [Downloaded from the World Wide Web on Aug. 8, 2003].

ITU-T, "ITU-T Recommendation H.261: Video Codec for Audio-visual Services at $p$ x 64 kbits," 28 pp. (1993).

ITU-T, "ITU-T Recommendation H.262: Information Technology—Generic Coding of Moving Pictures and Associated Audio Information: Videol," 218 pp. (1995).

ITU-T, "ITU-T Recommendation H.263: Video Coding for Low Bit Rate Communication," 167 pp. (1998).

ISO/IEC, "ISO/IEC 11172-2: Information Technology—Coding of Moving Pictures and Associated Audio for Storage Media at up to About 1,5 Mbit/s," 122 pp. (1993).

ISO/IEC, "Information Technology—Coding of Audio-Visual Objects: Visual, ISO/IEC 14496-2, Committee Draft," 330 pp. (1998).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

PCT Written Opinion dated Jun. 20, 2006.

International Search Report dated Jun. 20, 2006.

\* cited by examiner

Software 1080 Implementing Video
Encoder/Decoder With Conditional
Lapped Transform

```
filter_other_3_pixels = true
a0 = (2*(P3 - P6) - 5*(P4 - P5) + 4) >> 3
if (|a0| < PQUANT) {
    a1 = (2*(P1 - P4) - 5*(P2 - P3) + 4) >> 3
    a2 = (2*(P5 - P8) - 5*(P6 - P7) + 4) >> 3
     a3 = min(|a1|, |a2|)
    if (a3 < |a0|)
    {
        d = 5*((sign(a0) * a3) - a0)/8
        clip = (P4 - P5)/2
        if (clip == 0)
                filter_other_3_pixels = false
        else
        {
            if (clip > 0)
            {
                    if (d < 0)
                            d = 0
                    if (d > clip)
                            d = clip
            }
            else
            {
                    if (d > 0)
                            d = 0
                    if (d < clip)
                            d = clip
            }
            P4 = P4 - d
            P5 = P5 + d
        }
    }
    else
        filter_other_3_pixels = false
}
else
        filter_other_3_pixels = false
```

```
a0 = (2*(P3 - P6) - 5*(P4 - P5) + 4) >> 3
if (|a0| < PQUANT)
{
    a1 = (2*(P1 - P4) - 5*(P2 - P3) + 4) >> 3
    a2 = (2*(P5 - P8) - 5*(P6 - P7) + 4) >> 3
    a3 = min(|a1|, |a2|)
    if (a3 < |a0|)
    {
        d = 5*((sign(a0) * a3) - a0)/8
        clip = (P4 - P5)/2 if (clip > 0)
        {
            if (d < 0)
                d = 0
            if (d > clip)
                d = clip
            P4 = P4 - d
            P5 = P5 + d
        }
        else if (clip < 0)
        {
            if (d > 0)
                d = 0
            if (d < clip)
                d = clip
            P4 = P4 - d
            P5 = P5 + d
        }
    }
}
```

SLICE-LAYER IN VIDEO CODEC

CROSS REFERENCE TO RELATED APPLICATIONS

This application claims the benefit of U.S. Provisional Patent Application Ser. No. 60/501,081, filed Sep. 7, 2003, the disclosure of which is incorporated herein by reference.

TECHNICAL FIELD

The present invention relates to techniques for digitally encoding, decoding and processing video, images and other digital media content.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel as a set of three samples totaling 24 bits. For instance, a pixel may comprise an 8-bit luminance sample (also called a luma sample) that defines the grayscale component of the pixel and two 8-bit chrominance sample values (also called chroma samples) that define the color component of the pixel. Thus, the number of bits per second, or bit rate, of a typical raw digital video sequence may be 5 million bits per second or more.

Many computers and computer networks lack the resources to process raw digital video. For this reason, engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system. Compression can be lossless, in which quality of the video does not suffer, but decreases in the bit rate are limited by the inherent amount of variability (sometimes called entropy) of the video data. Or, compression can be lossy, in which quality of the video suffers, but achievable decreases in the bit rate are more dramatic. Lossy compression is often used in conjunction with lossless compression—in a system design in which the lossy compression establishes an approximation of information and lossless compression techniques are applied to represent the approximation.

In general, video compression techniques include "intra-picture" compression and "inter-picture" compression, where a picture is, for example, a progressively scanned video frame, an interlaced video frame (having alternating lines for video fields), or an interlaced video field. For progressive frames, intra-picture compression techniques compress individual frames (typically called I-frames or key frames), and inter-picture compression techniques compress frames (typically called predicted frames, P-frames, or B-frames) with reference to preceding and/or following frames (typically called reference or anchor frames).

The predicted frames may be divided into regions called macroblocks. A matching region in a reference frame for a particular macroblock is specified by sending motion vector information for the macroblock. A motion vector indicates the location of the region in the reference frame whose pixels are to be used as a predictor for the pixels current macroblock. The pixel-by-pixel difference, often called the error signal or residual, between the current macroblock (or the blocks thereof) and the macroblock predictor is derived. This error signal usually has lower entropy than the original signal. Therefore, the information can be encoded at a lower rate. An encoder performs motion estimation by determining a motion vector for a region of a frame by searching for a matching region in one or more reference frames to use as a predictor. An encoder or decoder performs motion compensation by applying the motion vector to find the predictor in the one or more reference frames.

The motion vector value for a macroblock is often correlated with the motion vectors for spatially surrounding macroblocks. Thus, compression of the data used to transmit the motion vector information can be achieved by coding the differential between the motion vector and a motion vector predictor formed from neighboring motion vectors.

Often in video compression techniques, blocks of pixels or other spatial domain video data such as residuals are transformed into transform domain data, which is often frequency domain (i.e., spectral) data. The resulting blocks of spectral data coefficients may be quantized and then entropy encoded.

When the data is decompressed prior to the resulting video being displayed, a decoder typically performs the inverse of the compression operations. For example, a decoder may perform entropy decoding, inverse quantization, and an inverse transform while decompressing the data. When motion compensation is used, the decoder (and encoder) reconstruct a frame from one or more previously reconstructed frames (which are now used as reference frames), and the newly reconstructed frame may then be used as a reference frame for motion compensation for later frames.

Many typical usage scenarios for digitally coded video involve transmission of the coded video between devices, and frequently between geographically distant locations. Further, many commonly used data transmission systems use packet-based transmission protocols, in which a data transmission is divided into separately routed units called "packets." These various transmission systems that carry digital video are often subject to noise and other sources of transmission errors, and can experience "packet loss." Such errors and packet loss can lead to failure to decode an individual frame, or multiple related frames of the video sequence.

It can therefore be desirable to encode partial regions of a picture in a video sequence as an independently decodable unit. This helps enable packetization of the video stream. Further, this introduces additional redundancy in the compressed video bitstream that increases its resilience to transmission errors and packet loss. For example, the decoding loss from a transmission error or lost packet can be limited to the partial region, instead of a full picture of the video sequence. However, this resilience is achieved at the cost of compression efficiency.

Numerous companies have produced video codecs. For example, Microsoft Corporation has produced a video encoder and decoder released for Windows Media Video 8. Aside from these products, numerous international standards specify aspects of video decoders and formats for compressed video information. These standards include the H.261, MPEG-1, H.262, H.263, and MPEG-4 standards. Directly or by implication, these standards also specify certain encoder details, but other encoder details are not specified. These products and standards use (or support the use of) different combinations of the compression and decompression techniques described above. In particular, these products and standards provide various techniques for partial picture unit coding.

One such technique divides a frame within the video sequence into slices. A slice is defined to contain one or more contiguous rows of macroblocks in their original left-to-right order. A slice begins at the first macroblock of a row, and ends at the last macroblock of the same or another row.

Various standards, e.g., MPEG-1, MPEG-2, H.263 (with GOBs being roughly equivalent to slices or with Annex K slice structured coding mode), MPEG-4 part 2 and H.264/JVT/MPEG-4part10, all have slices as part of their syntax. Among these, all of them disable intra prediction and motion vector prediction and most other forms of prediction across slice boundaries for error/loss robustness reasons. Among these, only H.263 (Annex J) and H.264/JVT include loop filters. H.263 handling of interlace is rather primitive (field coding only using Annex W supplemental enhancement indications). H.264 has a more error-robust header structure and allows the encoder to select whether or not loop filtering is to be applied across slice boundaries The implementation of slices in these various video decoding standards each strike a different balance between resiliency and coding efficiency.

SUMMARY

A video codec and bitstream syntax described herein includes a slice-layer that is designed to be flexible, and provide an effective combination of error-resilience and compression efficiency. This slice-layer provides the following key features:

a) an efficient slice addressing mechanism that works with progressive, interlace-frame and interlace-field coding methods, b) a flexible and efficient mechanism to retransmit the picture header in the slice-layer, and c) decoding independence by disabling of all forms of prediction, overlap and loop-filtering across slice-boundaries, so that a slice coded in intra-mode can be reconstructed error-free, irrespective of errors in other regions of the picture.

Additional features and advantages of the invention will be made apparent from the following detailed description of embodiments that proceeds with reference to the accompanying drawings.

BRIEF DESCRIPTION OF THE DRAWINGS

FIG. 13 is a pseudo-code listing of a filtering operation on a third pixel pair of a segment.

FIG. 14 is a pseudo-code listing of a filtering operation on a first, second and fourth pixel pairs of a segment.

DETAILED DESCRIPTION

The following description is directed to implementations of a slice layer in a video codec and bitstream syntax, which is designed to be flexible and provide an effective combination of error-resilience and compression efficiency. An exemplary application of the slice layer coding is in an image or video encoder and decoder. Accordingly, the slice layer coding is described in the context of a generalized image or video encoder and decoder, but alternatively can be incorporated in the bitstream syntax of various other image and video codecs that may vary in details from this exemplary bitstream syntax described below.

1. Generalized Video Encoder and Decoder

Figure 1:
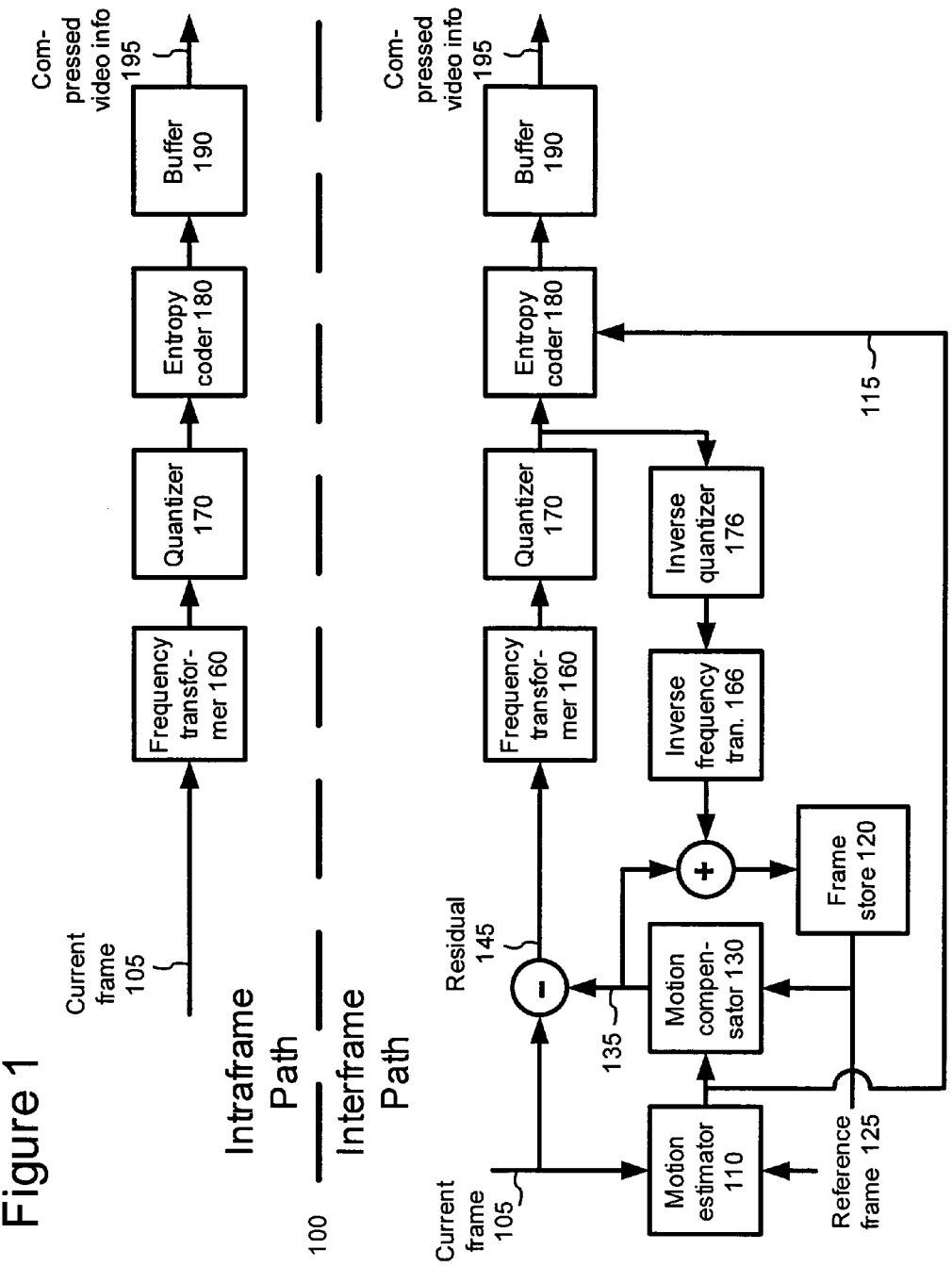
FIG. 1 is a block diagram of a video encoder employing the slice layer coding described herein.
Figure 2:
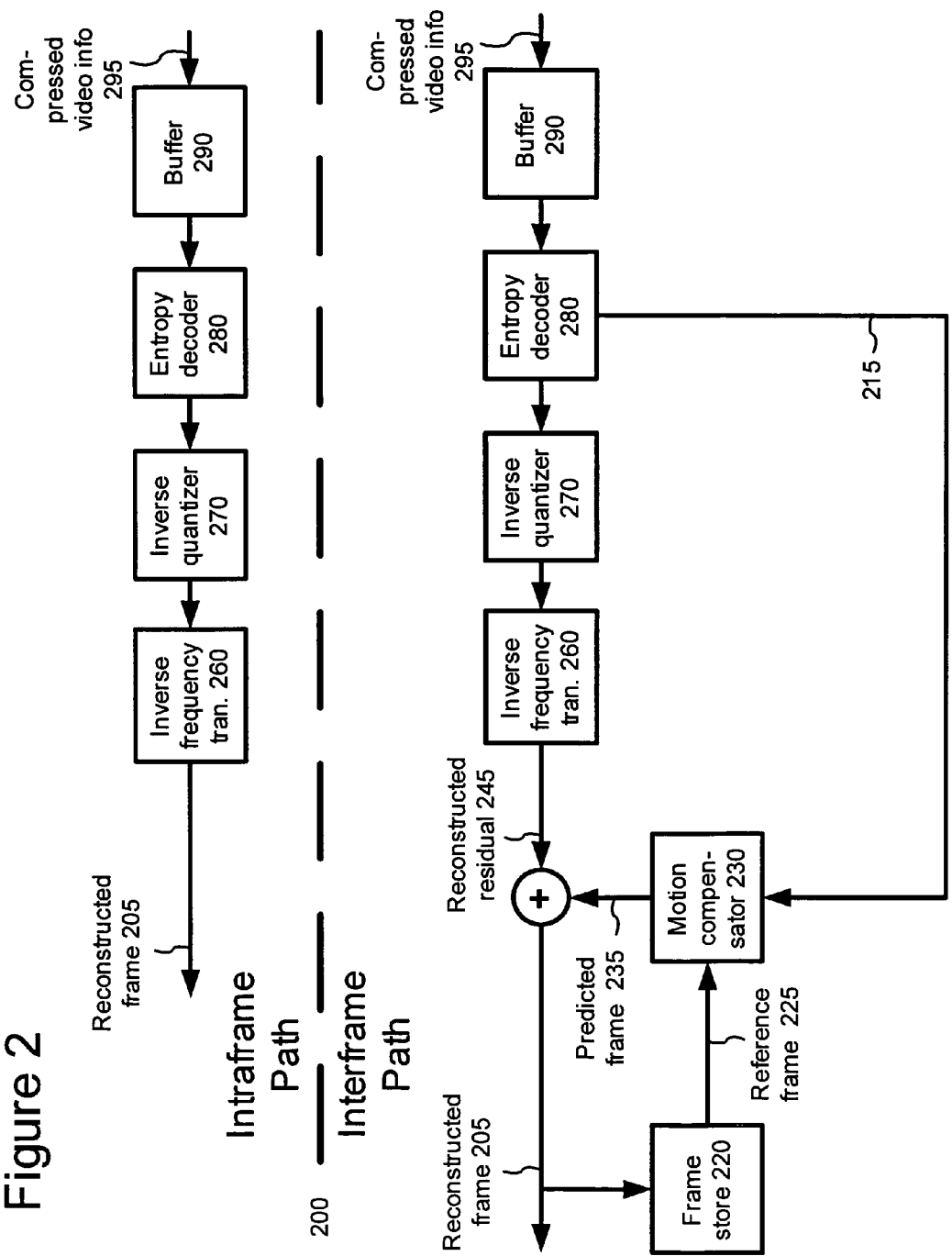
FIG. 2 is a block diagram of a video decoder employing the slice layer coding described herein.

FIG. 1 is a block diagram of a generalized video encoder (100) and FIG. 2 is a block diagram of a generalized video decoder (200), in which the WMV9/VC-9 transforms can be incorporated.

The relationships shown between modules within the encoder and decoder indicate the main flow of information in the encoder and decoder; other relationships are not shown for the sake of simplicity. In particular, FIGS. 1 and 2 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format.

The encoder (100) and decoder (200) are block-based and use a 4:2:0 macroblock format with each macroblock including 4 luminance 8×8 luminance blocks (at times treated as one 16×16 macroblock) and two 8×8 chrominance blocks. Alternatively, the encoder (100) and decoder (200) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 1 is a block diagram of a general video encoder system (100). The encoder system (100) receives a sequence of video frames including a current frame (105), and produces compressed video information (195) as output. Particular embodiments of video encoders typically use a variation or supplemented version of the generalized encoder (100).

The encoder system (100) compresses predicted frames and key frames. For the sake of presentation, FIG. 1 shows a path for key frames through the encoder system (100) and a path for forward-predicted frames. Many of the components of the encoder system (100) are used for compressing both key frames and predicted frames. The exact operations performed by those components can vary depending on the type of information being compressed.

A predicted frame [also called p-frame, b-frame for bi-directional prediction, or inter-coded frame] is represented in terms of prediction (or difference) from one or more other frames. A prediction residual is the difference between what was predicted and the original frame. In contrast, a key frame [also called i-frame, intra-coded frame] is compressed without reference to other frames.

If the current frame (105) is a forward-predicted frame, a motion estimator (110) estimates motion of macroblocks or other sets of pixels of the current frame (105) with respect to a reference frame, which is the reconstructed previous frame (125) buffered in the frame store (120). In alternative embodiments, the reference frame is a later frame or the current frame is bi-directionally predicted. The motion estimator (110) outputs as side information motion information (115) such as motion vectors. A motion compensator (130) applies the motion information (115) to the reconstructed previous frame (125) to form a motion-compensated current frame (135). The prediction is rarely perfect, however, and the difference between the motion-compensated current frame (135) and the original current frame (105) is the prediction residual (145). Alternatively, a motion estimator and motion compensator apply another type of motion estimation/compensation.

A frequency transformer (160) converts the spatial domain video information into frequency domain (i.e., spectral) data. For block-based video frames, the frequency transformer (160) applies a transform described in the following sections that has properties similar to the discrete cosine transform ["DCT"]. In some embodiments, the frequency transformer (160) applies a frequency transform to blocks of spatial prediction residuals for key frames. The frequency transformer (160) can apply an 8×8, 8×4, 4×8, or other size frequency transforms.

A quantizer (170) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (100) can use frame dropping, adaptive filtering, or other techniques for rate control.

When a reconstructed current frame is needed for subsequent motion estimation/compensation, an inverse quantizer (176) performs inverse quantization on the quantized spectral data coefficients. An inverse frequency transformer (166) then performs the inverse of the operations of the frequency transformer (160), producing a reconstructed prediction residual (for a predicted frame) or a reconstructed key frame. If the current frame (105) was a key frame, the reconstructed key frame is taken as the reconstructed current frame (not shown). If the current frame (105) was a predicted frame, the reconstructed prediction residual is added to the motion-compensated current frame (135) to form the reconstructed current frame. The frame store (120) buffers the reconstructed current frame for use in predicting the next frame. In some embodiments, the encoder applies a deblocking filter to the reconstructed frame to adaptively smooth discontinuities in the blocks of the frame.

The entropy coder (180) compresses the output of the quantizer (170) as well as certain side information (e.g., motion information (115), quantization step size). Typical entropy coding techniques include arithmetic coding, differential coding, Huffman coding, run length coding, LZ coding, dictionary coding, and combinations of the above. The entropy coder (180) typically uses different coding techniques for different kinds of information (e.g., DC coefficients, AC coefficients, different kinds of side information), and can choose from among multiple code tables within a particular coding technique.

The entropy coder (180) puts compressed video information (195) in the buffer (190). A buffer level indicator is fed back to bitrate adaptive modules. The compressed video information (195) is depleted from the buffer (190) at a constant or relatively constant bitrate and stored for subsequent streaming at that bitrate. Alternatively, the encoder system (100) streams compressed video information immediately following compression.

Before or after the buffer (190), the compressed video information (195) can be channel coded for transmission over the network. The channel coding can apply error detection and correction data to the compressed video information (195).

B. Video Decoder

FIG. 2 is a block diagram of a general video decoder system (200). The decoder system (200) receives information (295) for a compressed sequence of video frames and produces output including a reconstructed frame (205). Particular embodiments of video decoders typically use a variation or supplemented version of the generalized decoder (200).

The decoder system (200) decompresses predicted frames and key frames. For the sake of presentation, FIG. 2 shows a path for key frames through the decoder system (200) and a path for forward-predicted frames. Many of the components of the decoder system (200) are used for compressing both key frames and predicted frames. The exact operations performed by those components can vary depending on the type of information being compressed.

A buffer (290) receives the information (295) for the compressed video sequence and makes the received information available to the entropy decoder (280). The buffer (290) typically receives the information at a rate that is fairly constant over time, and includes a jitter buffer to smooth short-term variations in bandwidth or transmission. The buffer (290) can include a playback buffer and other buffers as well. Alternatively, the buffer (290) receives information at a varying rate. Before or after the buffer (290), the compressed video information can be channel decoded and processed for error detection and correction.

The entropy decoder (280) entropy decodes entropy-coded quantized data as well as entropy-coded side information (e.g., motion information, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (280) frequently uses different decoding techniques for different kinds of information (e.g., DC coefficients, AC coefficients, different kinds of side information), and can choose from among multiple code tables within a particular decoding technique.

If the frame (205) to be reconstructed is a forward-predicted frame, a motion compensator (230) applies motion information (215) to a reference frame (225) to form a prediction (235) of the frame (205) being reconstructed. For example, the motion compensator (230) uses a macroblock motion vector to find a macroblock in the reference frame (225). A frame buffer (220) stores previous reconstructed frames for use as reference frames. Alternatively, a motion compensator applies another type of motion compensation. The prediction by the motion compensator is rarely perfect, so the decoder (200) also reconstructs prediction residuals.

When the decoder needs a reconstructed frame for subsequent motion compensation, the frame store (220) buffers the reconstructed frame for use in predicting the next frame. In some embodiments, the encoder applies a deblocking filter to the reconstructed frame to adaptively smooth discontinuities in the blocks of the frame.

An inverse quantizer (270) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (260) converts the quantized, frequency domain data into spatial domain video information. For block-based video frames, the inverse frequency transformer (260) applies an inverse transform described in the following sections. In some embodiments, the inverse frequency transformer (260) applies an inverse frequency transform to blocks of spatial prediction residuals for key frames. The inverse frequency transformer (260) can apply an 8×8, 8×4, 4×8, or other size inverse frequency transforms.

2. Slice Layer Coding

As discussed in the background section above, one technique of preventing or minimizing decoding failures due to packet loss and transmission errors is to provide additional redundancy via coding in independently decodable partial picture units, such as the slices provided in some prior video codec standards. In general, a slice is a portion of a picture that includes one or more contiguous rows of macroblocks.

One of the main challenges of slices is to enable the codec to achieve the right trade-off between error resilience and compression. The reason is that some video codec applications or use scenarios have to overcome significant amount of packet loss, and therefore place a high premium on error resilience. Other applications require very minimal error resilience, but require efficient compression. In implementations of a video codec's bitstream syntax described herein, the syntax incorporates a slice layer or other partial picture unit layer designed so that the optimal choice of resilience and efficiency can be achieved. This capability is achieved in the following ways:

A) Perfect Reconstruction of an Intra-Slice: The slice-layer of the illustrated syntax has been designed such that operations such as loop-filtering, and overlap do not function across slices. Therefore, if all the macroblocks of a slice are intra-coded, and if the picture header corresponding to that slice is known, then that slice can be reconstructed exactly without error, irrespective of errors in other slices (regions) of the picture. This allows for perfect (error-free) reconstruction of an intra-slice, and provides significant error resilience capability.

B) Low cost method of Repeating Frame Header: Repetition of the picture header information increases the probability that the picture header will be received at the decoder, but comes at the cost of decreasing compression efficiency. The illustrated slice-layer syntax signals whether the picture header is transmitted in a slice using a 1-bit flag. This allows the encoder to choose both the number of slices, and the particular slice, in which picture header is retransmitted.

A. Syntax Hierarchy

Figure 3:
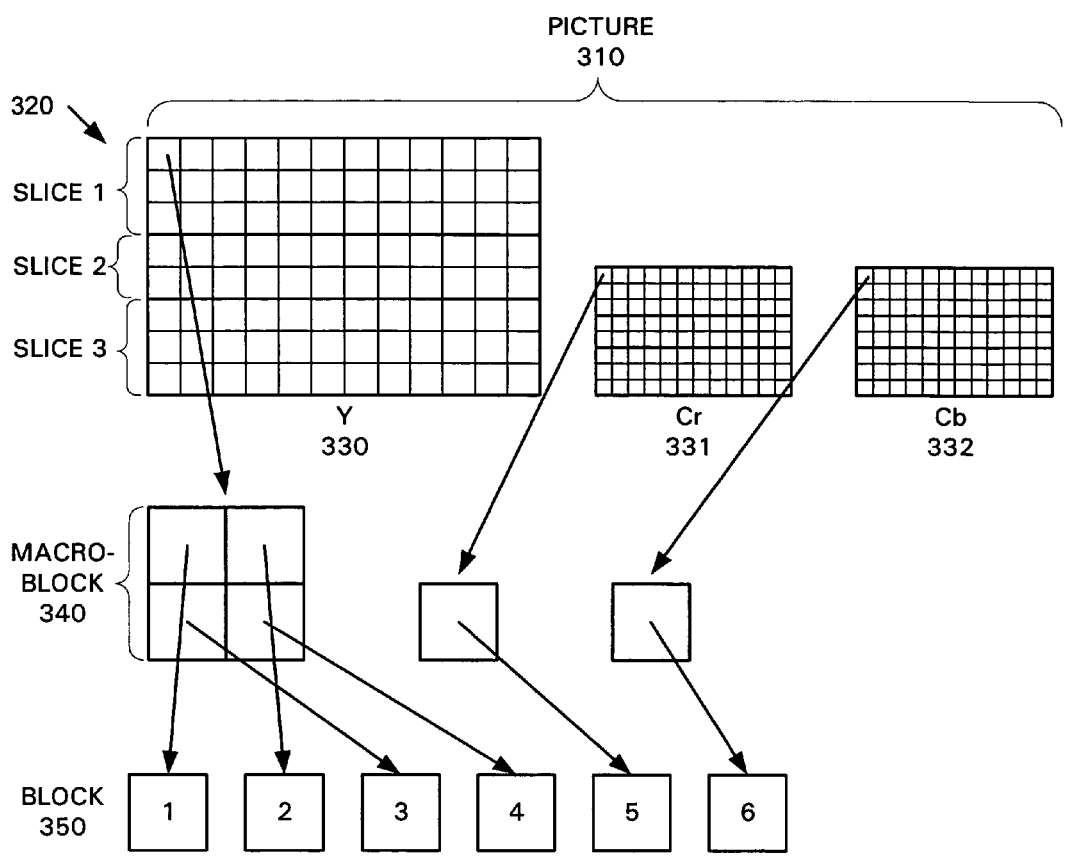
FIG. 3 is a diagram illustrating a hierarchical arrangement of elements of a video sequence represented in a compressed bitstream utilized by the video encoder/decoder employing slice layer coding.

More specifically, the illustrated video codec syntax represents video using a hierarchical syntax structure that decomposes each frame of the video sequence into three basic hierarchical layers—picture 310, macroblock 340 and block 350, as shown in FIG. 3. The picture 310 includes a luminance (Y) channel 330, and chrominance (Cr and Cb) channels 331–332. The picture layer 310 is made up of rows of macroblocks 340. Each macroblock generally contains six blocks: a 2×2 group of blocks from the luminance layer, and a block from each of the chrominance channels. The blocks generally consist of 8×8 luminance or chrominance samples (although 4×8, 8×4 and 4×4 transform blocks also can be used in the illustrated video codec syntax), to which a transform is applied for transform-based encoding.

Further, an optional fourth layer, called the slice layer 320, can be present between the picture layer 310, and the macroblock layer 340. A slice is defined to contain one or more contiguous rows of macroblocks that are scanned in raster-scan order. Thus, a picture 310 can be decomposed into slices 320, which in turn, can be decomposed into macroblocks 340. In this illustrated video codec syntax, a slice always begins at the first macroblock of a row, and ends at the last macroblock of the same or another row. Thus, a slice contains an integer number of complete rows. Further, pictures and slices are always byte-aligned in this illustrated video codec bitstream syntax, and are transmitted in an independent decodable unit (IDU) as described below. A new picture, or a slice, is detected via start-codes as outlined below.

B. Slice Layer Definition

A slice represents one or more contiguous rows of macroblocks that are scanned in raster-scan order. The slice layer in the illustrated syntax is optional, and can be skipped by coding a picture as a single independent decodable unit (IDU). When a picture is coded in multiple IDUs, slices are used. Note that a slice always begins at the first macroblock in a row, and ends at the last macroblock in the same or another row. Thus, a slice contains an integer number of complete rows. A slice is always byte-aligned, and each slice is transmitted in a different IDU. The beginning of a new slice is detected through search for start-codes as outlined below.

When a new slice begins, motion vector predictors, predictors for AC and DC coefficients, and the predictors for quantization parameters are reset. In other words, with respect to prediction, the first row of macroblocks in the slice is considered to be the first row of macroblocks in the picture. This ensures that there is no inter-slice dependency in predictors. Further, when slices are used, all bitplane information is carried in raw mode which ensures that each macroblock carries its own local information.

C. Slice Layer Syntax Structure

Figure 4:
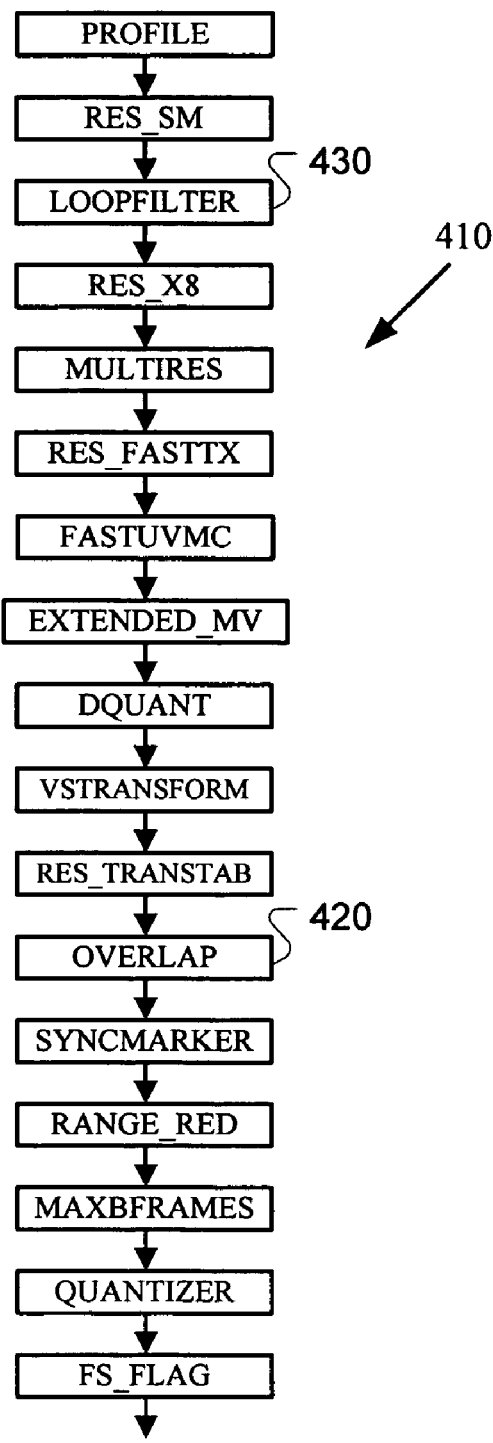
FIG. 4 is a sequence-level syntax diagram of a coding syntax of the compressed bitstream utilized by the video encoder/decoder employing the slice layer coding.
Figure 5:
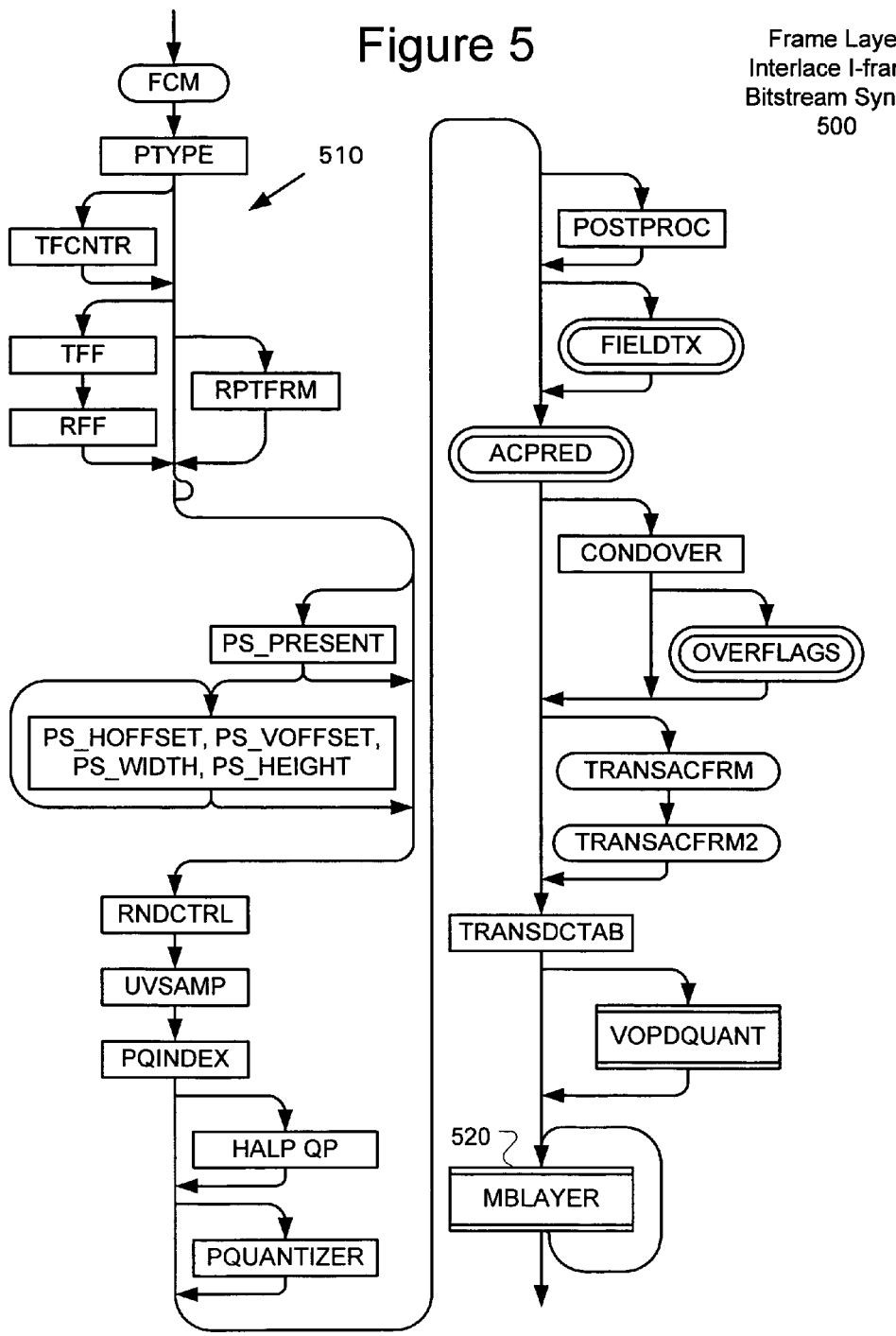
FIG. 5 is a frame-level syntax diagram of a coding syntax of the compressed bitstream utilized by the video encoder/decoder employing the slice layer coding.

With reference to FIGS. 4 and 5, the compressed video bitstream 195 (FIG. 1) includes information for a sequence of compressed progressive video frames or other pictures (e.g., interlace frame or interlace field format pictures). The bitstream is organized into several hierarchical layers that are decoded by a decoder such as the decoder (200) of FIG. 2. The highest layer is the sequence layer, which has information for the overall sequence of frames. Additionally (as previously summarized), each compressed video frame is made up of data that is structured into three hierarchical layers: picture, macroblock, and block (from top to bottom); and optionally a slice layer between the picture and macroblock layers.

FIG. 4 is a syntax diagram for the sequence layer 400, which includes a sequence header 410 followed by data for the picture layer 500 (see FIG. 5). The sequence header 410 includes several sequence-level elements that are processed by the decoder and used to decode the sequence.

FIG. 5 is a syntax diagram for the picture layer 500 for an interlace intra-coded frame ["interlace I-frame"]. Syntax diagrams for other pictures, such as progressive I-frames, P-pictures and B-frames have many similar syntax elements. The picture layer 500 includes a picture header 510 followed by data for the macroblock layer 520. The picture header 510 includes several picture-level elements that are processed by the decoder and used to decode the corresponding frame. Some of those elements are only present if their presence is signaled or implied by a sequence-level element or a preceding picture-level element.

Figure 6:
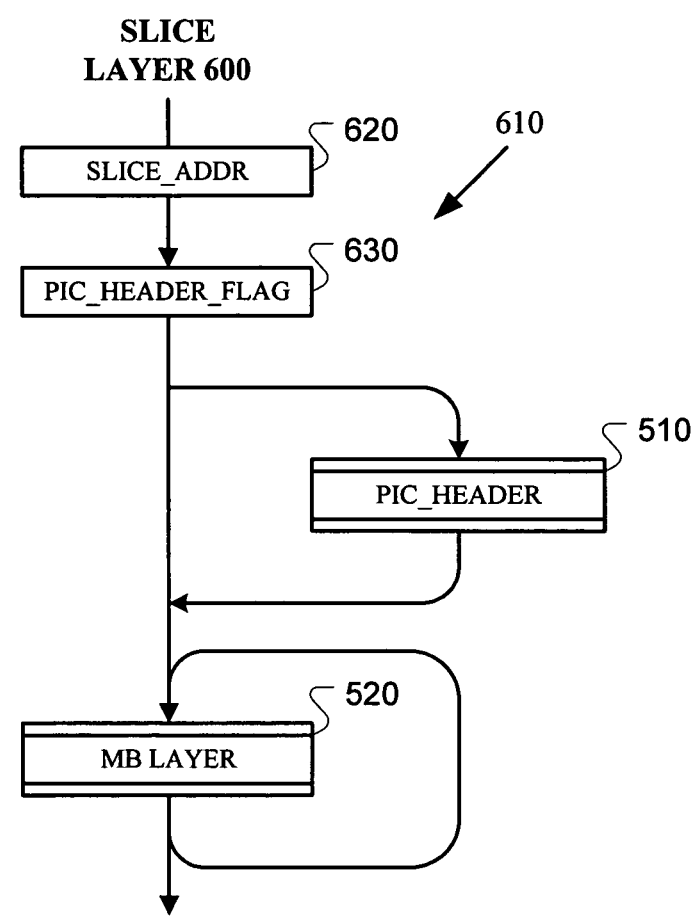
FIG. 6 is a slice layer-level syntax diagram of a coding syntax of the compressed bitstream utilized by the video encoder/decoder employing the slice layer coding.

FIG. 6 is a syntax diagram for the slice layer 600, which includes a slice header 610 followed by data for the macroblock layer 520. The elements that make up the slice header 610 include a slice address (SLICE_ADDR) element 620, and a picture header present flag (PIC_HEADER_FLAG) element 630, as also shown in the following table 1.

The slice address element 620 is a fixed-length 9-bit syntax element. The row address of the first macroblock row in the slice is binary encoded in this syntax element. In the illustrated implementation, the range of this syntax element is from 1 to 511, where the maximum picture size of 8192 corresponds to a maximum of 512 macroblock rows.

The PIC_HEADER_FLAG 630 is a 1-bit syntax element that is present in the slice header. If PIC_HEADER_FLAG =0, then the picture header information is not repeated in the slice header. If the PIC_HEADER_FLAG =1, the information of the picture header 510 (FIG. 5) appearing in the picture layer containing this slice is repeated in the slice header.

TABLE 1

Slice-Layer bitstream

| SLICE( ) { | Number of bits |
|---|---|
| SLICE_ADDR | 9 |
| PIC_HEADER_FLAG | 1 |
| if (PIC_HEADER_FLAG == 1) { | |
|     PICTURE_LAYER( ) | |
| } | |
| for ('all macroblocks') { | |
|     MB_LAYER ( ) | |
| } | |
| } | |

3. Independently Decodable Unit Start Codes

In the bitstream syntax of the illustrated video encoder/decoder, an Independently Decodable Unit (IDU) of compressed video data begins with an identifier called a Start Code (SC). An IDU could refer to a single picture, or a slice (i.e., group of macroblocks 10 in a picture), or a group of pictures (GOP), or a sequence header.

The start code is a sequence of four bytes, which consists of an unique three-byte Start Code Prefix (SCP), and an one byte Start Code Suffix (SCS). The SCP is the unique sequence of three bytes (0×000001). The SCS is used to identify the type of IDU that follows the start code. For example, the suffix of the start code before a picture is different from the suffix of the start code before a slice. Start codes are always byte-aligned.

An Encapsulation Mechanism (EM) is described to prevent emulation of the start code prefix in the bitstream. The compressed data before encapsulation is called Raw Independently Decodable Unit (RIDU), while Encapsulated IDU (EIDU) refers to the data after encapsulation.

The following section provides an encoder-side perspective on how start code and encapsulation operates. Section E.2 specifies detection of start codes and EIDUs at the decoder. Section E.3 deals with extraction of an RIDU from an EIDU. Section E.4 specifies start code suffixes for various IDU types.

A. Start-codes and Encapsulation—An encoder viewpoint

The encapsulation of a RIDU to obtain an EIDU is described below.

Step 1: A trailing '1' bit is added to the end of the RIDU. The EM now appends between 0 and 7 bits onto the end of the IDU such that the IDU ends in a byte-aligned location. The value of these "stuffing" bits is '0'. As a result, at the end of this step, the IDU is represented in an integer number of bytes, in which the last byte of the IDU cannot be a zero-valued byte. The resulting string of bytes is called the payload bytes of the IDU.

Step 2: The three-byte start code prefix (0×000001), and the appropriate start code suffix that identifies the IDU type are placed at the beginning of the EIDU.

Step 3: The remainder of the EIDU is formed by processing the payload bytes of the IDU through the following emulation prevention process. The emulation of start code prefixes in the IDU is eliminated via byte-stuffing. The emulation prevention process is equivalent to the following operation:

1) Replace each string within the payload of 2 consecutive bytes of value 0×00 followed by a byte that contains zero values in its six MSBs (regardless of the LSB values) with 2 bytes of value 0×00 followed by a byte equal to 0×03 followed by a byte equal to the last byte of the original three-byte data string. This process is illustrated in Table 2.

TABLE 2

Emulation Prevention Pattern Replacement

| Pattern to Replace | Replacement Pattern |
|---|---|
| 0x00, 0x00, 0x00 | 0x00, 0x00, 0x03, 0x00 |
| 0x00, 0x00, 0x01 | 0x00, 0x00, 0x03, 0x01 |
| 0x00, 0x00, 0x02 | 0x00, 0x00, 0x03, 0x02 |
| 0x00, 0x00, 0x03 | 0x00, 0x00, 0x03, 0x03 |

Step 3: The three-byte start code prefix (0×000001), and the appropriate start code suffix that identifies the IDU type are attached to the beginning of the IDU. The resulting payload is an encapsulated IDU.

The encoder is also allowed to insert any number of zero-valued stuffing bytes after the end of an EIDU. Equivalently, any number of zero-valued stuffing bytes can be inserted before a start code prefix. The start code is structured such that it can be detected by a decoder even if in the presence of these zero-valued stuffing bytes. In some mission environments such as H.320, the encoder may use this feature to insert extra zero-valued stuffing bytes bytes as desired, which can enable the decoder to quickly recover the location of the start-codes even if it has lost track of the intended alignment of the bitstream to byte boundaries. Further, these zero-valued stuffing bytes may also be useful in splicing bitstreams, filling a constant bit-rate channel, etc. Zero-Valued Stuffing bytes prior to start codes, or at the end of an EIDU, are not processed through the encapsulation mechanism—only RIDU data requires such processing.

B. Detection of Start codes and EIDU

The detection of an EIDU starts with the search for the start code prefix.

Detection of Start Codes Starting from Byte-Aligned Positions. In a decoder that cannot lose byte-alignment, or once byte alignment has been established, start code detection is conducted as follows.

1. Whenever a string of two or more bytes of value 0×00 followed by a byte of value 0×01 is found, a start code prefix detection is declared.

When 2 successive start-codes prefixes are detected, the payload bitstream between them is declared as a new EIDU.

Detection of Start Codes After Loss of Byte Alignment in a Decoder. In a decoder that has lost byte-alignment (as can happen in some transmission environments), start-code prefix detection and byte-alignment detection are conducted as follows. Whenever a string of three or more bytes of value 0×00 is found, followed by any non-zero byte is found, a start code prefix detection is declared and byte alignment is understood to be recovered such that the first nonzero bit in the non-zero byte is the last bit of a byte-aligned start code.

C. Extraction of RIDU from EIDU

The extraction of a raw IDU from an encapsulated IDU is described below.

Step 1: The start-code suffix is used to identify the type of IDU.

Step 2: The first step is to remove the zero-valued stuffing bytes at the end of EIDU. After this step, the last byte of the IDU must have a non-zero value.

Step 3: The bytes used for emulation prevention are detected and removed. The process is as follows:

Whenever a string of two bytes of value 0×00 is followed by a byte equal to 0×03, the byte equal to 0×03 is understood to be an emulation prevention byte and is discarded.

This process is illustrated in Table 3.

TABLE 3

Decoder Removal of Emulation Prevention Data

| Pattern to Replace | Replacement Pattern |
|---|---|
| 0x00, 0x00, 0x03, 0x00 | 0x00, 0x00, 0x00 |
| 0x00, 0x00, 0x03, 0x01 | 0x00, 0x00, 0x01 |
| 0x00, 0x00, 0x03, 0x02 | 0x00, 0x00, 0x02 |
| 0x00, 0x00, 0x03, 0x03 | 0x00, 0x00, 0x03 |

The following byte patterns, if seen within the bitstream, represent error conditions (noting that loss of proper byte alignment by the decoder is considered an error condition):

a) A string of two bytes of value 0×00 followed by a byte equal to 0×02 indicates error condition.

b) A string of three or more bytes of value 0×00, if not followed by a byte of 0×01 is an error condition (note that if two or more bytes equal to zero are followed by a byte of value 0×01 and byte alignment has not been lost, detection of a subsequent start code is declared).

c) A string of two bytes of value 0×00, followed by a byte of value 0×03, followed by a byte which is not one of 0×00, 0×01, or 0×02, or 0×03.

Step 4: In the last-byte of the IDU, the last non-zero bit is identified, and that non-zero bit, and all the "zero" bits that follow are discarded. The result is a raw IDU.

D. Start-code Suffixes for IDU Types

The start code suffixes for various IDU types are presented in Table 4.

TABLE 4

Start Code Suffixes for Various IDU Types

| Start-code Suffix | IDU Type |
|---|---|
| 0x00 | SMPTE Reserved |
| 0x01–0x09 | SMPTE Reserved |
| 0x0A | End-of-Sequence |
| 0x0B | Slice |
| 0x0C | Field |
| 0x0D | Frame |
| 0x0E | Entry-point Header |
| 0x0F | Sequence Header |
| 0x10–0x1A | SMPTE Reserved |
| 0x1B | Slice Level User Data |
| 0x1C | Field Level User Data |
| 0x1D | Frame Level User Data |
| 0x1E | Entry-point Level User Data |
| 0x1F | Sequence Level User Data |
| 0x20–0x7F | SMPTE Reserved |
| 0x80–0xFF | Forbidden |

The SequenceHeader suffix is sent to identify IDUs which carry a sequence header 410 (FIG. 4).

The Entry-point Header suffix is sent to identify IDUs which carry an entry-point header.

The Picture suffix is sent to identify IDUs which contains the picture 320 (FIG. 3, and the picture header 510 (FIG. 5).

The Field suffix is sent to identify IDUs which contain the second field of a picture that is coded as two separate fields.

The Slice suffix is sent to identify IDUs which carry slices 320 (FIG. 3), and the slice header 610 (FIG. 6).

The Sequence, Entry-point, Frame, Field, and Slice Level User data suffixes are used to transmit any user defined data associated with the Sequence, Entry-point, Frame, Field, and Slice respectively.

The "End-of-sequence" is an optional suffix which indicates that the current sequence has ended, and no further data will be transmitted for this sequence. Note that the transmission of an "end-of-sequence" may be present, but the end of a sequence shall be inferred from the header of the next sequence.

4. Slice Layer Independence

The illustrated slice layer 320 (FIG. 3) also achieves independent decodability, and independent reconstruction. This enables the slice to be reconstructed error-free at the decoder irrespective of transmission errors or packet loss in other regions of the picture 310 (FIG. 3).

A. Independent Decodability

The content of a slice layer 320 is decoded independently of the picture content in other slices or regions of the picture. When a new slice begins, the encoder 100 and decoder 200 reset the motion vector predictors, predictors for AC and DC coefficients, and the predictors for quantization parameters. In other words, with respect to prediction, the first row of macroblocks in the slice is treated as if it were the first row of macroblocks in the picture. This helps to ensure that there is no inter-slice dependency in predictors. Further, when slices are used, macroblock level information that is otherwise coded (e.g., using bitplane coding) at the picture layer (such as motion vector mode, and flags for ac prediction) are carried locally with other macroblock level information such as transform coefficients. This allows each slice to be decoded independently (i.e., without reliance on data decoded from other slices of the picture).

B. Independent Reconstruction:

Further, the process of reconstruction of a slice is performed independently from reconstruction of any other slice (e.g., adjacent slices) in a picture. Accordingly, any processes (such as inloop deblocking or overlap filtering, described below) that would otherwise be applied across boundaries between adjacent slices in a picture are disallowed. In other words, the top and bottom macroblock rows of each slice are treated as if they are the top and bottom macroblock rows of the picture in such boundary processes.

Overlap Smoothing

Overlapped transforms are modified block based transforms that exchange information across the block boundary. With a well designed overlapped transform, blocking artifacts can be minimized. For intra blocks, the illustrated video codec simulates an overlapped transform by coupling an 8×8 block transform with a filtering operation (referred to as overlap smoothing). Edges of an 8×8 block that separate two intra blocks are smoothed—in effect an overlapped transform is implemented at this interface. Except, overlap smoothing is not performed across slice boundaries in any case.

If the sequence layer syntax element OVERLAP 420 (FIG. 4) is set to 1, then a filtering operation may be conditionally performed across edges of two neighboring Intra blocks, for both the luminance and chrominance channels. This filtering operation (referred to as overlap smoothing) is performed subsequent to decoding the frame, and prior to in-loop deblocking. However, overlap smoothing may be done after the relevant macroblock slices are decoded as this is functionally equivalent to smoothing after decoding the entire frame.

Figure 7:
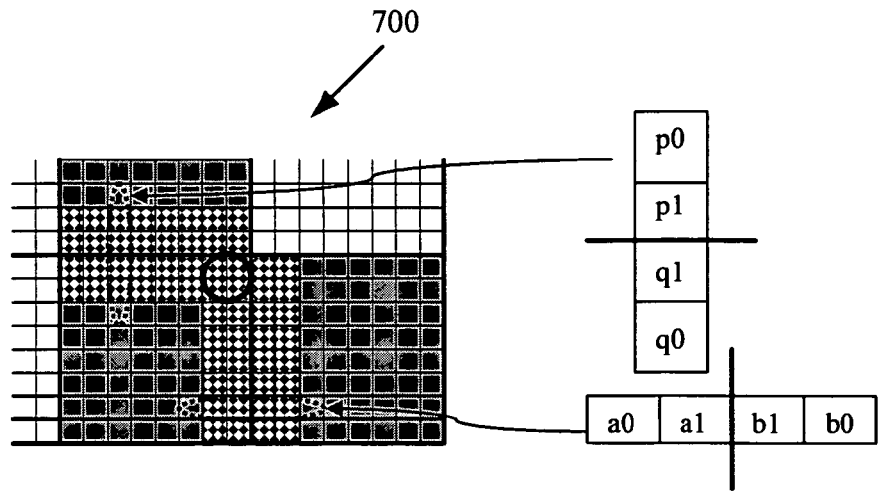
FIG. 7 is a diagram depicting an example of overlap smoothing performed at block boundaries.

FIG. 7 shows an example of overlap smoothing performed on a portion of a P frame with I blocks. This could be either the luminance or chrominance channel. I blocks are gray (or crosshatched) and P blocks are white. In this illustration, the edge interface over which overlap smoothing is applied is marked with a crosshatch pattern. Overlap smoothing is applied to two pixels on either side of the separating boundary. The right bottom area of frame is shown here as an example. Pixels occupy individual cells and blocks are separated by heavy lines. The dark circle marks the 2×2 pixel corner subblock that is filtered in both directions.

The lower inset in FIG. 7 shows four labeled pixels, a0 and a1 are to the left and b1, b0 to the right of the vertical block edge. The upper inset shows pixels marked p0, p1, q1 and q0 straddling a horizontal edge. The next section describes the filter applied to these four pixel locations.

Overlap smoothing is carried out on the unclamped 16 bit reconstruction. This is necessary because the forward process associated with overlap smoothing may result in range expansion beyond the permissible 8 bit range for pixel values. The result of overlap smoothing is clamped down to 8 bits, in line with the remainder of the pixels not touched by overlap smoothing.

Vertical edges (pixels a0, a1, b1, b0 in the above example) are filtered first, followed by the horizontal edges (pixels p0, p1, q1, q0). The intermediate result following the first stage of filtering (vertical edge smoothing) is stored in 16 bit. The core filters applied to the four pixels straddling either edge are given below:

$$\begin{pmatrix} y_0 \\ y_1 \\ y_2 \\ y_3 \end{pmatrix} = \left( \begin{pmatrix} 7 & 0 & 0 & 1 \\ -1 & 7 & 1 & 1 \\ 1 & 1 & 7 & -1 \\ 1 & 0 & 0 & 7 \end{pmatrix} \begin{pmatrix} x_0 \\ x_1 \\ x_2 \\ x_3 \end{pmatrix} + \begin{pmatrix} r_0 \\ r_1 \\ r_0 \\ r_1 \end{pmatrix} \right) >> 3$$

The original pixels being filtered are (x0, x1, x2, x3). r0 and r1 are rounding parameters, which take on alternating values of 3 and 4 to ensure statistically unbiased rounding. The original values are filtered by the matrix with entries that are clearly easy to implement. These values, after adding the rounding factors, are bit shifted by three bits to give the filtered output (y0, y1, y2, y3).

For both horizontal and vertical edge filters, the rounding values are r0=4, r1=3 for odd-indexed columns and rows respectively, assuming the numbering within a block to start at 1. For even-indexed columns/rows, r0=3 and r1=4.Filtering is defined as an in-place 16 bit operation—thus the original pixels are overwritten after smoothing. For vertical edge filtering, the pixels (a0, a1, b1, b0) correspond to (x0, x1, x2, x3), which in turn get filtered to (y0, y1, y2, y3). Likewise, for horizontal edge filtering, the correspondence is with (p0, p1, q1, q0) respectively.

Pixels in the 2×2 corner, shown by the dark circle in FIG. 7, are filtered in both directions. The order of filtering determines their final values, and therefore it is important to maintain the order—vertical edge filtering followed by horizontal edge filtering—for bit exactness. Conceptually, clamping is to be performed subsequent to the two directional filtering stages, on all pixels that are filtered. However, there may be some computational advantage to combining clamping with filtering.

In-loop Deblock Filtering

Loop filtering is a process performed by the video encoder/decoder at block boundaries to smooth out discontinuities. If the sequence layer syntax element LOOPFILTER 430 (FIG. 4) is set to 1, then a filtering operation is performed on each reconstructed frame. This filtering operation is performed prior to using the reconstructed frame as a reference for motion predictive coding.

Since the intent of loop filtering is to smooth out the discontinuities at block boundaries, the filtering process operates on the pixels that border neighboring blocks. For P pictures, the block boundaries can occur at every $4^{th}$, $8^{th}$, $12^{th}$, etc pixel row or column depending on whether an 8×8, 8×4 or 4×8 Inverse Transform is used. For I pictures filtering occurs at every $8^{th}$, $16^{th}$, $24^{th}$, etc pixel row and column.

Figure 8:
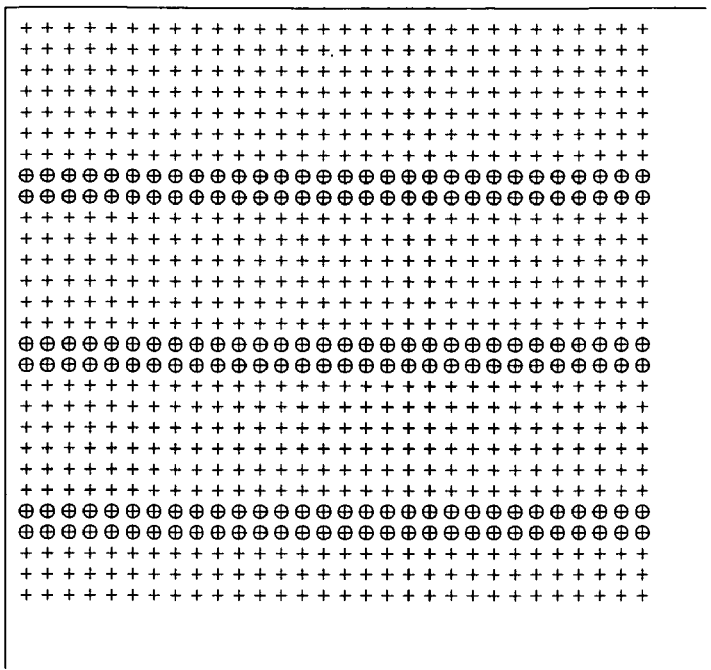
FIG. 8 is a diagram depicting an example of horizontal block boundary pixels in an I picture on which in-loop deblock filtering is performed.
Figure 9:
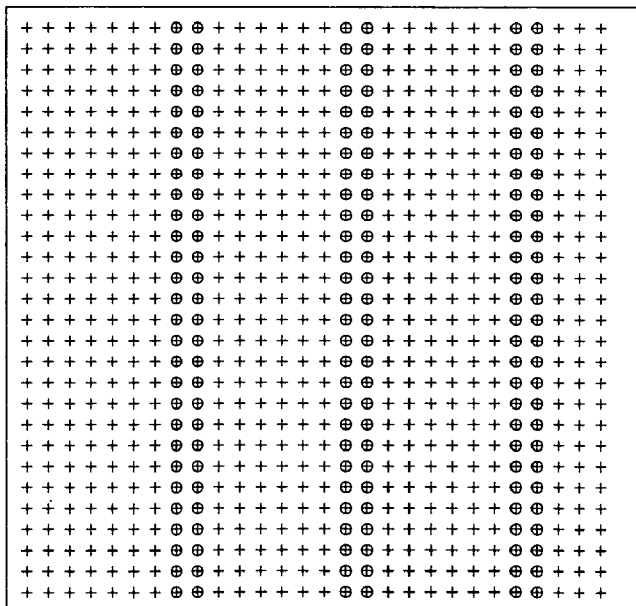
FIG. 9 is a diagram depicting an example of vertical block boundary pixels in an I picture on which in-loop deblock filtering is performed.
Figure 11:
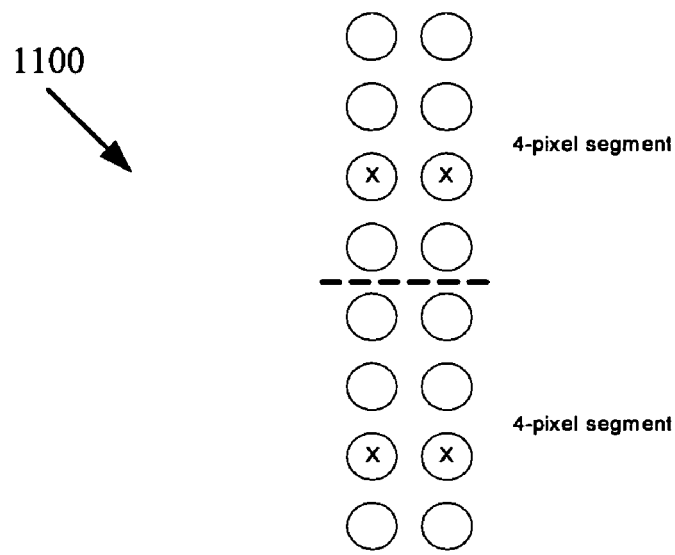
FIG. 11 is a diagram depicting a set of four-pixel segments used in loop filtering.

For I pictures, deblock filtering is performed at all 8×8 block boundaries, except deblock filtering is not performed at slice boundaries (which are treated similar to picture edges). FIGS. 8 and 9 show the pixels that are filtered along the horizontal and vertical border regions of an I-picture frame. The figures show the upper left corner of a component (luma, Cr or Cb) plane. The crosses represent pixels and the circled crosses represent the pixels that are filtered.

As the figures show, the top horizontal line and first vertical line of a picture or slice are not filtered. Although not depicted, the bottom horizontal line and last vertical line of a picture or slice are also not filtered. In more formal terms, the following lines are filtered:

where N=the number of horizontal 8×8 blocks in the plane (N*8=horizontal frame size) and M=the number of vertical 8×8 blocks in the frame (M*8=vertical frame size), Horizontal lines (7,8), (15,16) . . . ((N−1)*8−1, (N−1)*8) are filtered, and Vertical lines (7, 8), (15, 16) . . . ((M−1)*8−1, (M−1)*8) are filtered.

The order in which the pixels are filtered is important. All the horizontal boundary lines in the frame are filtered first followed by the vertical boundary lines.

For P pictures, blocks may be Intra or Inter-coded. Intra-coded blocks always use an 8×8 Transform to transform the samples and the 8×8 block boundaries are always filtered. Inter-coded blocks may use an 8×8, 8×4, 4×8 or 4×4 Inverse Transform to construct the samples that represent the residual error. Depending on the status of the neighboring blocks, the boundary between the current and neighboring blocks may or may not be filtered. In any case, the boundary edges of a picture or slice are not filtered.

Filter Operation

This section describes the filtering operation that is performed on the block boundary pixels in I and P frames, as discussed above.

Since the minimum number of consecutive pixels that will be filtered in a row or column is four and the total number of pixels in a row or column will always be a multiple of four, the filtering operation is performed on segments of four pixels.

Figure 12:
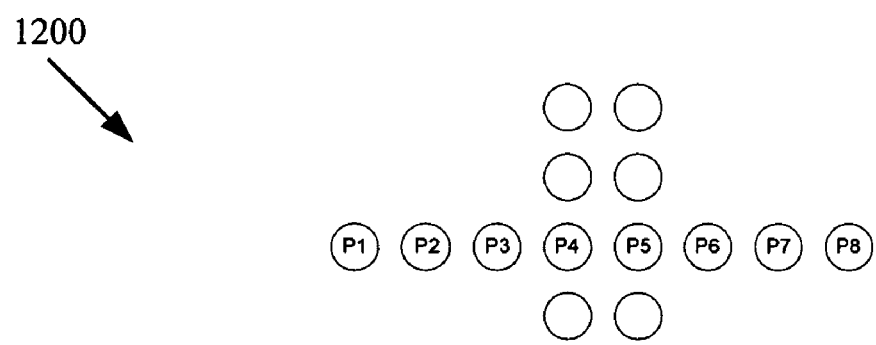
FIG. 12 is a diagram depicting a pixels used in a filtering operation.

For example, if the eight pixel pairs that make up the vertical boundary between two blocks is filtered, then the eight pixels are divided into two 4-pixel segments 1100 as shown in FIG. 12. In each 4-pixel segment, the third pixel pair is filtered first as indicated by the X's. The result of this filter operation determines whether the other three pixels in the segment are also filtered, as described below.

Figure 10:
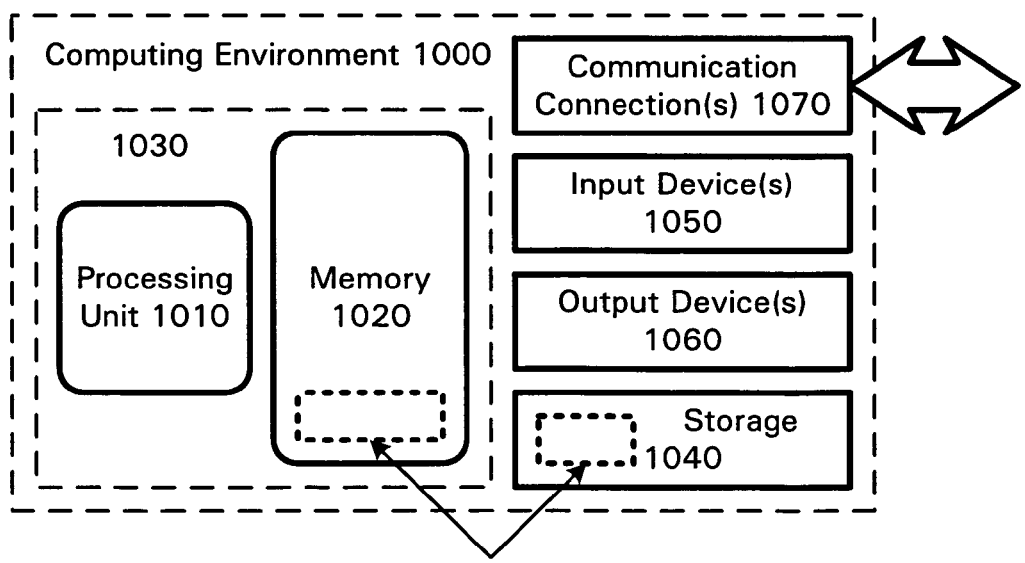
FIG. 10 is a block diagram of a suitable computing environment for the video encoder/decoder of FIGS. 1 and 2.

FIG. 10 shows the pixels 1200 that are used in the filtering operation performed on the $3^{rd}$ pixel pair. Pixels P4 and P5 are the pixel pairs that may be changed in the filter operation.

The pseudocode 1300 of FIG. 13 shows the filtering operation performed on the $3^{rd}$ pixel pair in each segment. The value filter_other_3_pixels indicates whether the remaining 3 pixel pairs in the segment are also filtered. If filter_other_3_pixels=true, then the other three pixel pairs are filtered. If filter_other_3_pixels=false, then they are not filtered, and the filtering operation proceeds to the next 4-pixel segment. The pseudocode 1400 of FIG. 14 shows the filtering operation that is performed on the $1^{st}$, $2^{nd}$ and $4^{th}$ pixel pair if filter_other_3_pixels=true.

This section used the vertical boundary for example purposes. The same operation is used for filtering the horizontal boundary pixels.

5. Computing Environment

The above described implementations of the slice layer coding can be performed on any of a variety of devices in which image and video signal processing is performed, including among other examples, computers; image and video recording, transmission and receiving equipment; portable video players; video conferencing; Web video streaming applications; and etc. The image and video coding techniques can be implemented in hardware circuitry (e.g., in circuitry of an ASIC, FPGA, etc.), as well as in image and video processing software executing within a computer or other computing environment (whether executed on the central processing unit (CPU), or dedicated graphics processor, video card or like), such as shown in FIG. 10.

FIG. 10 illustrates a generalized example of a suitable computing environment (1000) in which the described slice layer coding may be implemented. The computing environment (1000) is not intended to suggest any limitation as to scope of use or functionality of the invention, as the present invention may be implemented in diverse general-purpose or special-purpose computing environments.

With reference to FIG. 10, the computing environment (1000) includes at least one processing unit (1010) and memory (1020). In FIG. 10, this most basic configuration (1030) is included within a dashed line. The processing unit (1010) executes computer-executable instructions and may be a real or a virtual processor. In a multi-processing system, multiple processing units execute computer-executable instructions to increase processing power. The memory (1020) may be volatile memory (e.g., registers, cache, RAM), non-volatile memory (e.g., ROM, EEPROM, flash memory, etc.), or some combination of the two. The memory (1020) stores software (1080) implementing the described slice layer coding.

A computing environment may have additional features. For example, the computing environment (1000) includes storage (1040), one or more input devices (1050), one or more output devices (1060), and one or more communication connections (1070). An interconnection mechanism (not shown) such as a bus, controller, or network interconnects the components of the computing environment (1000). Typically, operating system software (not shown) provides an operating environment for other software executing in the computing environment (1000), and coordinates activities of the components of the computing environment (1000).

The storage (1040) may be removable or non-removable, and includes magnetic disks, magnetic tapes or cassettes, CD-ROMs, CD-RWs, DVDs, or any other medium which can be used to store information and which can be accessed within the computing environment (1000). The storage (1040) stores instructions for the software (1080) implementing the audio encoder that performs the slice layer coding.

The input device(s) (1050) may be a touch input device such as a keyboard, mouse, pen, or trackball, a voice input device, a scanning device, or another device that provides input to the computing environment (1000). For audio, the input device(s) (1050) may be a sound card or similar device that accepts audio input in analog or digital form, or a CD-ROM reader that provides audio samples to the computing environment. The output device(s) (1060) may be a display, printer, speaker, CD-writer, or another device that provides output from the computing environment (1000).

The communication connection(s) (1070) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The slice layer coding/decoding techniques herein can be described in the general context of computer-readable media. Computer-readable media are any available media that can be accessed within a computing environment. By way of example, and not limitation, with the computing environment (1000), computer-readable media include memory (1020), storage (1040), communication media, and combinations of any of the above.

The slice layer coding herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of decoding video and images, comprising:
    decoding a picture from a coded bitstream having a syntax hierarchy comprising at least a picture layer, an optional independently decodable partial picture unit, and a macroblock layer, wherein a coding syntax of the optional independently decodable partial picture unit signals an address of said unit and an indication whether picture header information is repeated in said unit;
    in the case that the independently decodable partial picture unit is included,
    decoding said signaled indication whether picture header information is repeated in said unit;
    if picture header information is indicated to be repeated, decoding the picture header information;
    decoding the signaled address;
    reconstructing the partial picture unit at a location in the picture indicated by the signaled address; and
    performing overlap smoothing on at least some block edges within said partial picture unit, excepting at boundary edges of said partial picture unit.

2. A method of decoding video and images, comprising:
    decoding a picture from a coded bitstream having a syntax hierarchy comprising at least a picture layer, an optional independently decodable partial picture unit, and a macroblock layer, wherein a coding syntax of the optional independently decodable partial picture unit signals an address of said unit and an indication whether picture header information is repeated in said unit;
    in the case that the independently decodable partial picture unit is included,
    decoding said signaled indication whether picture header information is repeated in said unit;
    if picture header information is indicated to be repeated, decoding the picture header information;
    decoding the signaled address;
    reconstructing the partial picture unit at a location in the picture indicated by the signaled address; and
    performing deblocking filtering of at least some block edges within said partial picture unit, excepting at boundary edges of said partial picture unit.

3. A method of coding/decoding an image or video, comprising:
    coding/decoding a picture in at least one independently decodable partial picture unit;
    at start of coding/decoding picture content information of a respective one of said at least one independently decodable partial picture unit, resetting prediction coding parameters;
    reconstructing picture content of said respective partial picture unit independent of picture content outside of said respective partial picture; and
    performing deblocking of block edges within said picture content of said respective partial picture unit, excepting at boundary edges of said respective partial picture unit.

4. A method of coding/decoding an image or video, comprising:
    coding/decoding a picture in at least one independently decodable partial picture unit;
    at start of coding/decoding picture content information of a respective one of said at least one independently decodable partial picture unit, resetting prediction coding parameters;
    reconstructing picture content of said respective partial picture unit independent of picture content outside of said respective partial picture; and performing overlap filtering of block edges within said picture content of said respective partial picture unit, excepting at boundary edges of said respective partial picture unit.

5. At least one computer-readable medium having a stored software module thereon that is executable by a processing unit to perform a method of coding/decoding an image or video bitstream coded using independently decodable partial picture units, the method comprising:
    determining whether partial picture unit coding is to be performed for a picture coded within the bitstream;
    if so, performing coding/decoding and reconstruction of picture content within each partial picture unit independent of picture content outside of said partial picture unit; and
    performing deblocking of block edges within the picture content of the respective partial picture unit, excepting at boundary edges of the respective partial picture unit.

6. At least one computer-readable medium having a stored software module thereon that is executable by a processing unit to perform a method of coding/decoding an image or video bitstream coded using independently decodable partial picture units, the method comprising:
    determining whether partial picture unit coding is to be performed for a picture coded within the bitstream;
    if so, performing coding/decoding and reconstruction of picture content within each partial picture unit independent of picture content outside of said partial picture unit; and
    performing overlap filtering of block edges within the picture content of the respective partial picture unit, excepting at boundary edges of the respective partial picture unit.

* * * * *